US006775475B1

(12) United States Patent
Traver (10) Patent No.: US 6,775,475 B1
(45) Date of Patent: Aug. 10, 2004

(54) CAMERA TROLLEY APPARATUS AND METHODS (76) Inventor: Ned W. Traver, 7242 W. Dreyfuss Dr., Peoria, AZ (US) 85381

( * ) Notice: Subject to any disclaimer, the term of this patent is extended or adjusted under 35 U.S.C. 154(b) by 0 days.

(21) Appl. No.: 10/277,251

(22) Filed: Oct. 21, 2002

(51) Int. Cl.[7] .............................................. G03B 15/00
(52) U.S. Cl. .............................. 396/1; 396/428; 352/243
(58) Field of Search ........................... 396/1, 419, 428; 352/243

(56) References Cited

U.S. PATENT DOCUMENTS 4,699,484 A * 10/1987 Howell et al. ............... 352/243
5,119,734 A * 6/1992 Schwarzkopf ............... 104/246
5,784,966 A * 7/1998 Brown et al. ................ 104/304

* cited by examiner

Primary Examiner—David M. Gray
(74) Attorney, Agent, or Firm—Parsons & Goltry; Michael W. Goltry; Robert A. Parsons (57) ABSTRACT

A camera supporting chassis has attached clamp wheel assemblies. The clamp wheel assemblies secure opposing supports, and a camera is attached to the chassis. The chassis carries a brake capable of securing the chassis in place. The clamp wheel assemblies not only secure the chassis to the supports but also permit rollered movement of the chassis along the supports, allowing panning camera shots with the camera attached to the chassis.

39 Claims, 7 Drawing Sheets

CAMERA TROLLEY APPARATUS AND METHODS

FIELD OF THE INVENTION

This invention relates to cameras and to camera-supporting trolleys and methods.

BACKGROUND OF THE INVENTION

Cameras are expensive, especially high-end video cameras for use in filming television programs and commercials, and those for use in filming motion pictures. It is often necessary to mount such video cameras on mechanisms that permit the camera to be moved for achieving a desired manner of camera movement during a video shoot, such as panning video shots. Such existing mechanisms are very expensive, bulky, difficult to transport, occupy a considerably large amount of space in storage during periods of nonuse, and are difficult to use. Given these and other deficiencies in the art, the need for certain new and useful improvements is evident.

SUMMARY OF THE INVENTION

The above problems and others are at least partially solved and the above purposes and others realized in an improved camera supporting apparatus including a camera supporting chassis having attached clamp wheel assemblies. The clamp wheel assemblies secure opposing supports of a support structure, such as the sidepieces of a ladder, the opposing marginal edges or extremities of a table or bench or the like, etc. The clamp wheel assemblies not only secure camera supporting chassis to supports, but also permit rollered movement of the camera supporting chassis along the supports, allowing panning camera shots with a camera attached to the camera supporting chassis.

Another apparatus embodiment includes a camera supporting chassis having attached first and second wheel sets, and a first clamp wheel attached to the chassis opposing the first wheel set. A second clamp wheel is attached to the chassis opposing the second wheel set. The first and second wheel sets consist of opposing substantially parallel sets of attached inline wheels. The first clamp wheel is mounted for movement in reciprocal directions in opposition to the first wheel set, and the second clamp wheel is mounted for movement in reciprocal directions in opposition to the second wheel set. A first brace wheel is secured to the chassis and disposed laterally of the first wheel set, and a second brace wheel is secured to the chassis and disposed laterally of the second wheel set. The chassis is furnished with an attached brake, which is adjustable and capable of securing the chassis in place. The first and second wheel sets are adjustable between a first position toward one another and a second position away from one another. In a particular embodiment, a camera is attached to the chassis. In another embodiment, a first support member is secured by and between the first wheel set and the first clamp wheel, and a second support member is secured by and between the second wheel set and the second clamp wheel. In yet another embodiment, a ladder has opposing sidepieces joined at intervals by rungs, in which one of the sidepieces is secured by and between the first wheel set and the first clamp wheel, and the other of the sidepieces is secured by and between the second wheel set and the second clamp wheel.

Yet another apparatus embodiment includes a camera supporting chassis having attached opposing first and second wheel sets, a first clamp wheel attached to the chassis opposing the first wheel set, and a second clamp wheel attached to the chassis opposing the second wheel set. The first and second wheel sets consist of opposing substantially parallel sets of attached inline wheels. The first clamp wheel is mounted for movement in reciprocal directions in opposition to the first wheel set, and the second clamp wheel is mounted for movement in reciprocal directions in opposition to the second wheel set. A first brace wheel is secured to the chassis and disposed laterally of the first wheel set, and a second brace wheel is secured to the chassis and disposed laterally of the second wheel set. The chassis is furnished with an attached brake, which is adjustable and capable of securing the chassis in place. The first and second wheel sets are adjustable between a first position toward one another and a second position away from one another. In a particular embodiment, a camera is attached to the chassis. In another embodiment, a first support member is secured by and between the first wheel set and the first clamp wheel, and a second support member is secured by and between the second wheel set and the second clamp wheel. In yet another embodiment, a ladder has opposing sidepieces joined at intervals by rungs, in which one of the sidepieces is secured by and between the first wheel set and the first clamp wheel, and the other of the sidepieces is secured by and between the second wheel set and the second clamp wheel.

Still another apparatus embodiment includes a camera supporting chassis having attached substantially parallel first and second inline wheel sets, a first clamp wheel attached to the chassis opposing the first inline wheel set, and a second clamp wheel attached to the chassis opposing the second inline wheel set. The first clamp wheel is mounted for movement in reciprocal directions in opposition to the first inline wheel set, and the second clamp wheel is mounted for movement in reciprocal directions in opposition to the second inline wheel set. A first brace wheel is secured to the chassis and disposed laterally of the first inline wheel set, and a second brace wheel is secured to the chassis and disposed laterally of the second inline wheel set. The chassis is furnished with an attached brake, which is adjustable and capable of securing the chassis in place. The first and second inline wheel sets are adjustable between a first position toward one another and a second position away from one another. In a particular embodiment, a camera is attached to the chassis. In another embodiment, a first support member is secured by and between the first inline wheel set and the first clamp wheel, and a second support member is secured by and between the second inline wheel set and the second clamp wheel. In yet another embodiment, a ladder has opposing sidepieces joined at intervals by rungs, in which one of the sidepieces is secured by and between the first inline wheel set and the first clamp wheel, and the other of the sidepieces is secured by and between the second inline wheel set and the second clamp wheel.

Yet still another apparatus embodiment includes opposing substantially parallel supports, a camera carried by a chassis having attached substantially parallel first and second inline wheel sets, a first clamp wheel attached to the chassis opposing the first inline wheel set, and a second clamp wheel attached to the chassis opposing the second inline wheel set, in which one of the supports is secured by and between the first inline wheel set and the first clamp wheel, and the other of the supports is secured by and between the second inline wheel set and the second clamp wheel. The first clamp wheel is mounted for movement in reciprocal directions in opposition to the first inline wheel set, and the second clamp wheel is mounted for movement in reciprocal directions in opposition to the second inline wheel set. A first brace wheel is secured to the chassis and disposed laterally of and opposes the one of the supports, and a second brace wheel is secured to the chassis and disposed laterally of and opposes the other of the supports. A brake is attached to the chassis for movement between a first position away from one of the supports and a second position securing the chassis to the one of the supports. The first and second inline wheel sets are adjustable between a first position toward one another and a second position away from one another, and the supports are joined at intervals by rungs.

Consistent with the foregoing summary of various embodiments of the invention and the ensuing teachings, which are taken together, the invention also contemplates associated apparatus and method embodiments.

BRIEF DESCRIPTION OF THE DRAWINGS

Referring to the drawings.

DETAILED DESCRIPTION OF PREFERRED EMBODIMENT

Figure 1:
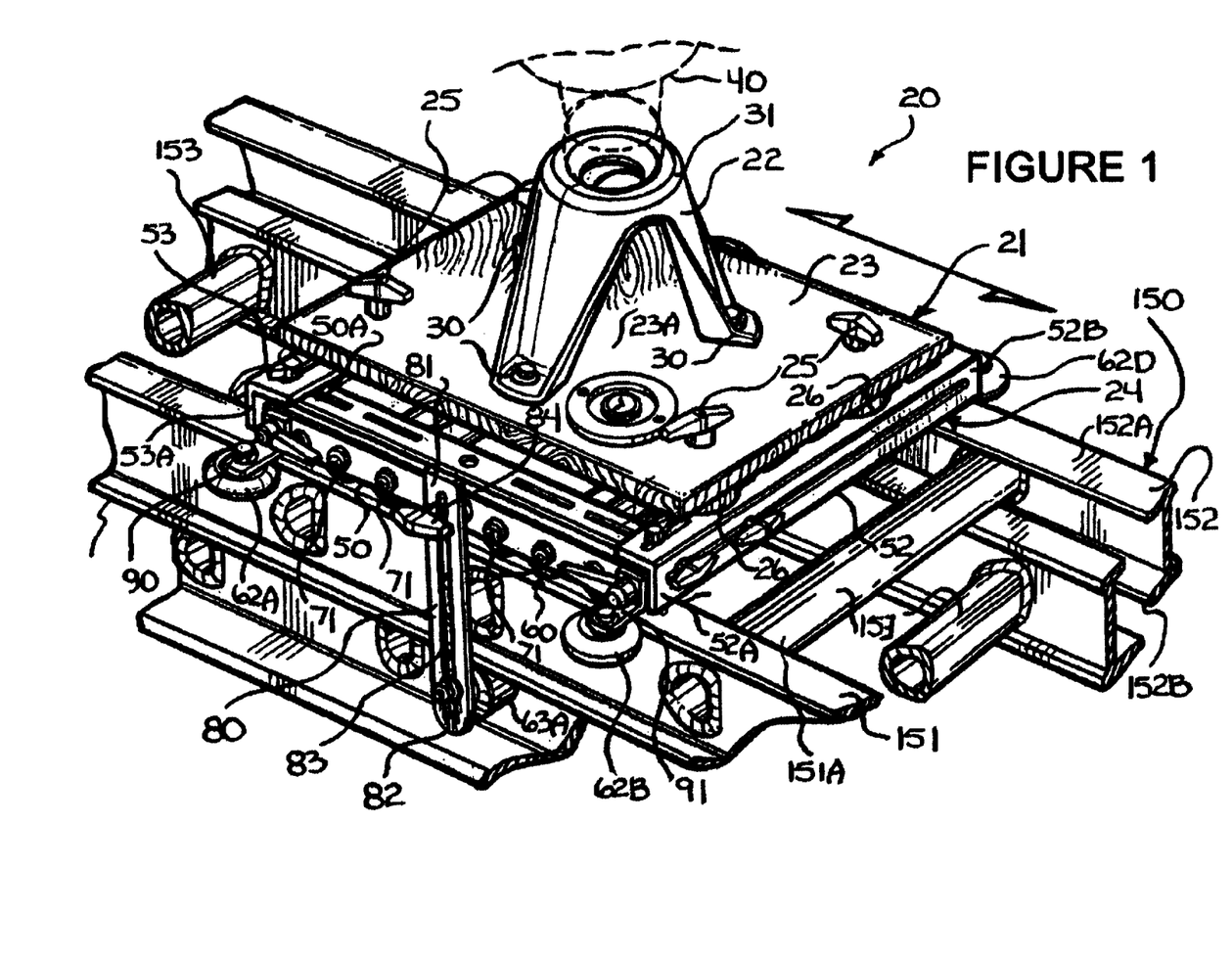
FIG. 1 is an isometric view of a camera supporting apparatus constructed in accordance with the principle of the invention including a camera supporting chassis having attached clamp wheel assemblies securing opposing supports of a support structure.

Turning now to the drawings, in which like reference characters indicate corresponding elements throughout the several views, attention is first directed to FIG. 1 in which is seen a camera supporting apparatus, embodying the principle of the instant invention, generally indicated by the reference character 20 including a camera supporting chassis 21 having attached clamp wheel assemblies. Chassis 21 includes a high hat 22, a platform 23 and a wheeled framework 24 fashioned with the clamp wheel assemblies, which are discussed infra. Chassis 21 is easily assembled, is relatively light, compact and inexpensive, and easy to install with a support structure for permitting panning video camera movement. Platform 23 is rigid and is made of virtually any rigid material such as wood, plastic, steel, aluminum, a laminate structure (e.g., laminated superimposed layers of natural and/or synthetic materials), or other rigid material or combination of rigid materials. In shape platform 23 is generally planar and square, although it can be provided in other shapes such as rectangular, round, oval, triangular, etc. Platform 23 is secured to framework 24 with handled threaded elements/fasteners 25, which extend through openings formed through platform 23 and have threaded ends that threadably secure threaded openings of framework 24 in a conventional manner of threaded attachment. In the immediate embodiment, four threaded fasteners 25 are shown tightened in place securing platform 23 to framework 24, in which each are disposed proximate one of the four corners of platform 23. Less or more such threaded fasteners can be used, and they can be readily loosened and disengaged for removing the assembly of platform 23 and the attached high hat 22 from framework 24. Corresponding bolts can be used with threaded fasteners 25, if desired. Those of ordinary skill will readily appreciate that virtually any attachment system can be used to secure platform 23 to framework 24, not the least of which include rivets, clamp structures, etc.

Figure 3:
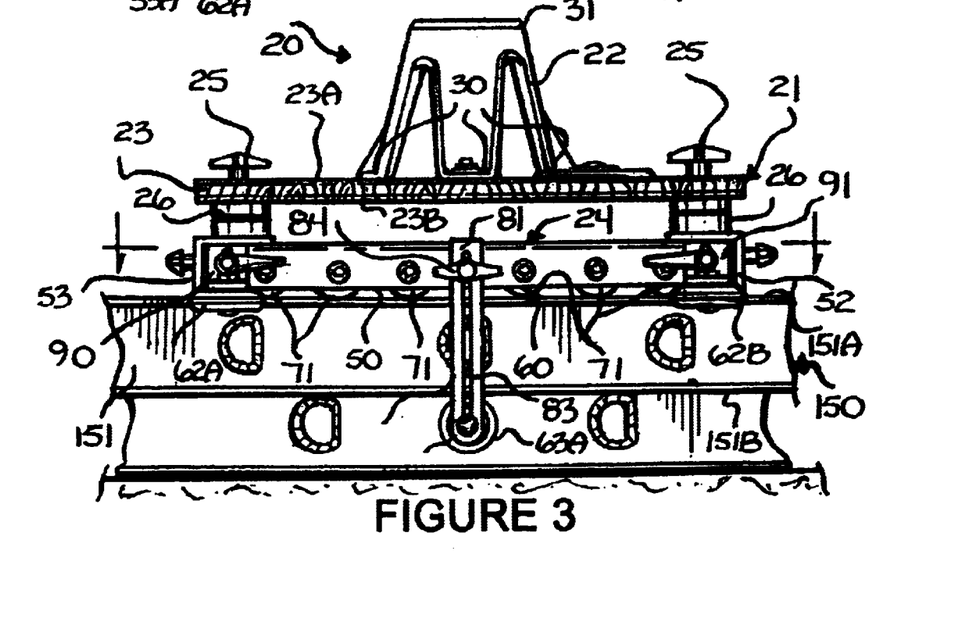
FIG. 3 is a side elevation of the camera supporting apparatus of FIG. 1.
Figure 4:
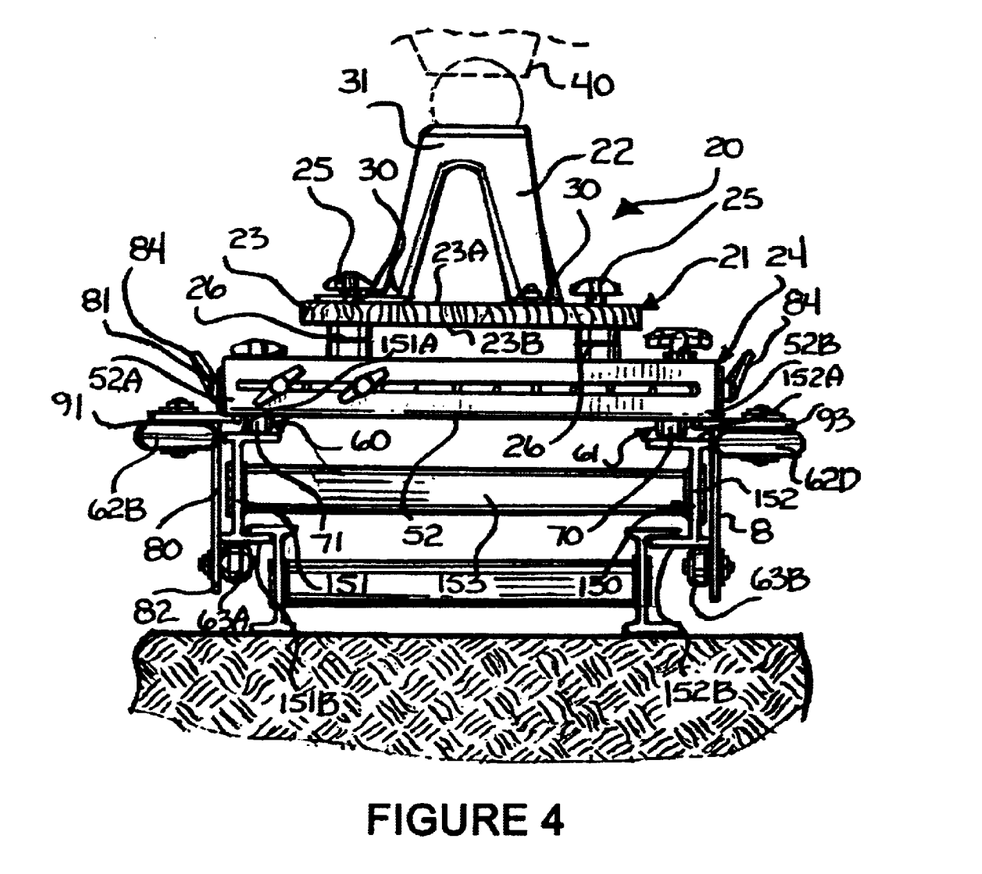
FIG. 4 is an end elevation of the camera supporting apparatus of FIG. 1.

Platform 23 has an upper major surface 23A and, as seen in FIGS. 3 and 4, an opposing lower major surface 23B. Upper major surface 23A faces away from framework 24 and lower major surface 23B faces framework 24. Threaded fasteners 25 each pass through spacers 26 (FIGS. 1, 3 and 4) disposed between lower major surface 23B of platform 23 and framework 24, for affecting a desired spacing between platform 32 and framework 24. Spacers 26 can each be made of virtually any material or combination of materials including plastic, wood, rubber, etc., and any desired number of spacers can be used in connection with each one of threaded fasteners 25. Spacers 26 can be omitted, if desired, and platform 23 disposed directly against framework 24.

High hat 22 is secured to platform 23 and extends away from upper major surface 23A. High hat 22 is conventionally constructed having feet 30 and an opposing distal extremity 31, which is configured as a socket that is adapted and arranged to secure the attachment end of a video camera in a conventional manner. The attachment end of a video camera is typically referred to as a head, and that attachment of the head to distal extremity 31 is known in the art. Camera 40 is illustrated in dotted outline and denoted at 40 in FIGS. 1 and 4. When camera 40 is attached to high hat 22 as shown, camera 40 is considered part of the invention in combination. Feet 30 are directed against upper major surface 23A and are secured to platform 23 with corresponding nut and bolt fastening assemblies as illustrated, although virtually any conventional fastening technique can be used for effecting the attachment of feet 30 to platform 23.

Framework 24 supports platform 23 and high hat 22, is wheeled and is designed to be attached/clamped to a support structure for wheeled movement permitting panning video camera shots. Referring to FIGS. 1–4 in relevant part, framework 24 is an openwork structural frame fashioned of steel, aluminum, plastic, wood, or other substantially rigid material or combination of materials. In the disclosed preferred embodiment, framework 24, in general, consists of an arrangement of attached elongate supports, including opposing, substantially parallel side supports 50,51 and opposing, substantially parallel end supports 52,53. The supports, which can each constitute a single element or a plurality of attached elements, have a generally L-shaped cross section, and other forms of bar or elongate stock cane be used with other cross-sectional shapes. Side support 50 has opposing ends 50A,50B, side support 51 has opposing ends 51A,51B, end support 52 has opposing ends 52A,52B, and end support 53 has opposing ends 53A,53B. Ends 50A,50B are secured to ends 53A,52A, respectively, and ends 51A,51B are secured to ends 53B,52B, respectively. The manner of attachment of the ends of supports 50–53 is discussed infra.

Framework 24 carries attached wheel sets 60,61, attached brace wheels 62A,62B,62C,62D, and attached clamp wheels 63A,63B, which cooperate to facilitate a wheeled attachment of apparatus 20 to a support structure, in accordance with the principle of the invention and which is discussed, infra. As seen in FIG. 1, wheel set 60, brace wheels 62A,62B and clamp wheel 63A are attached to and carried by side support 50. Wheel set 61, brace wheels 62C,62D and clamp wheel 63B are carried by side support 51. Brace wheels 62A,62B can be considered part of wheel set 60. Clamp wheel 63A can also be considered part of wheel set 60. Brace wheels 62C,62D can be considered part of wheel set 61. Clamp wheel 63B can also be considered part of wheel set 61. Wheel assemblies 60,61 can be considered clamp wheel assemblies, if desired, each being capable of clamping onto a support. Accordingly, and with regard to an exemplary and broad embodiment, the invention provides camera supporting chassis 21 having attached clamp wheel sets or assemblies 60,61 each capable of securing opposing supports for facilitating a secure roller- or wheel-clamp attachment of chassis 21 and of a camera attached thereto, such as camera 40.

Figure 2:
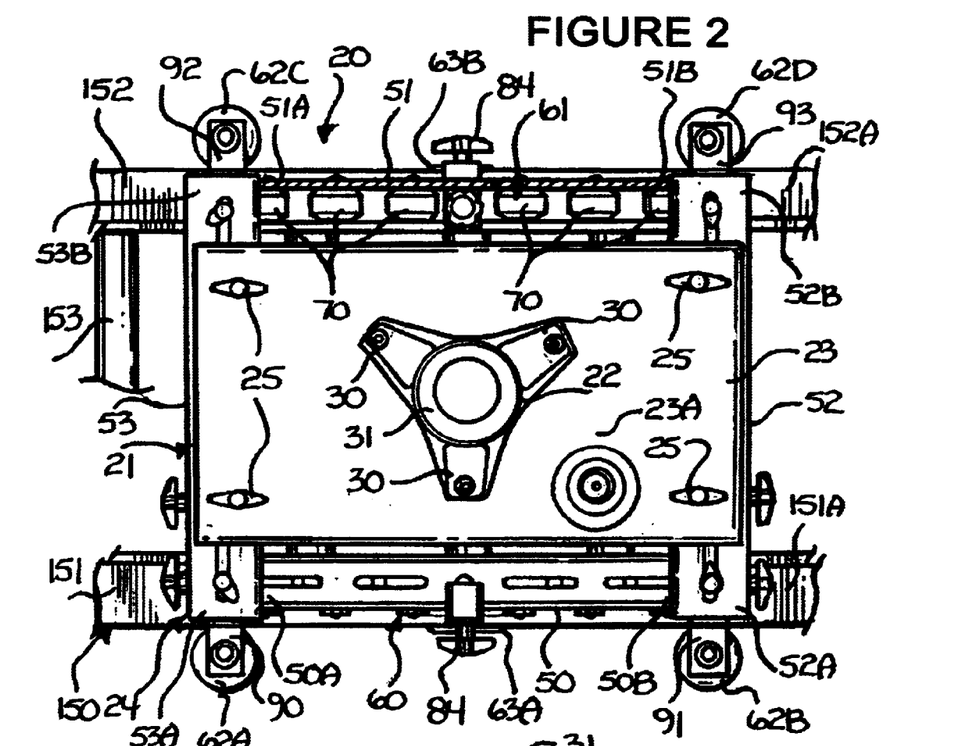
FIG. 2 is a top elevation of the camera supporting apparatus of FIG. 1.
Figure 10:
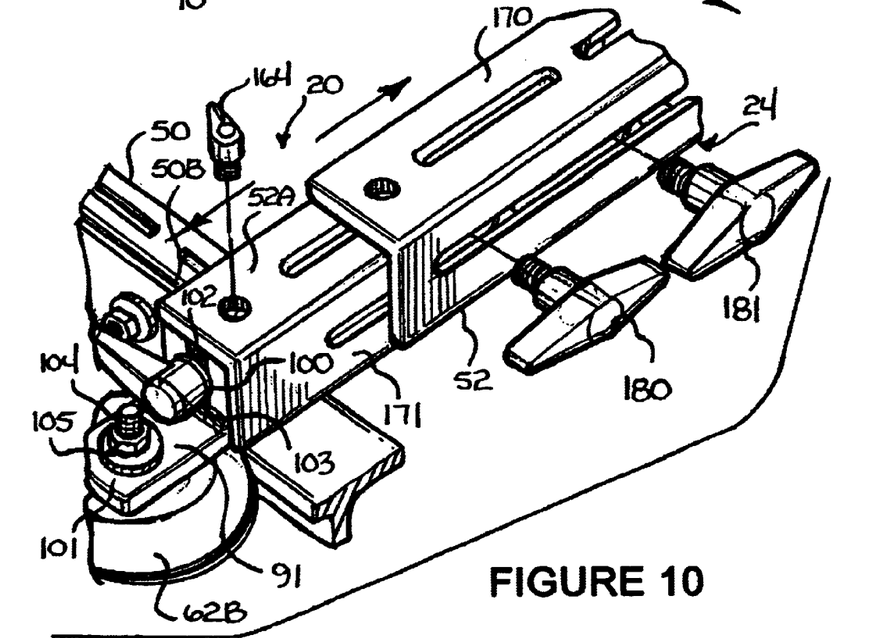
FIG. 10 is a partially exploded perspective view of the camera supporting apparatus of FIG. 1 illustrating support members and attachment elements for securing the support members.

Referring to FIGS. 2 and 10, wheel set 61 consists of wheels 70 secured to side support member 51 in an inline configuration, much like the wheels of conventional inline skates. In FIG. 2, portions of side support 51 are cut away illustrating wheels 70. Wheels 70 reside in the same plane and are disposed at equally spaced intervals along substantially the entire length of side support member 51 from end 51A to end 51B. Wheels 70 rotate freely and, as mentioned above, are of the type commonly found with readily available inline skates, each being secured to side support 51 with a nut and bolt assembly, although virtually any suitable manner of attachment can be used without departing from the invention. In this specific embodiment, each wheel is secured to a bolt, which is secured to framework 24 with a corresponding nut. Although six wheels 70 are shown, less or more can be employed. Wheel set 60 is substantially identical to wheel set 61, and consists of wheels 71 secured to side support member 50 in an inline configuration, as seen in FIGS. 1 and 3. Wheels 71 reside in the same plane, are disposed at equally spaced intervals along substantially the entire length of side support member 50 from end 50A to end 50B, and oppose, and are substantially parallel to, wheels 70. Wheels 71 rotate freely and, like wheels 70, are of the type commonly found with readily available inline skates, each being secured to side support 50 with a nut and bolt assembly, although virtually any suitable manner of attachment can be used without departing from the invention. Although six wheels 71 are shown, less or more can be employed. In accordance with the preferred embodiment disclosed herein, wheel sets 60,61 thus consist of opposing substantially parallel sets of inline wheels 70,71, i.e., opposing substantially parallel inline wheel sets.

Although an inline configuration is preferred for wheel set 61, other wheeled configurations can be used. Also, although wheel set 61 consists of one set of inline wheels, it can be made up of more sets of inline wheels, if desired. Furthermore, although an inline configuration is preferred for wheel set 60, other wheeled configurations can be used. Also, although wheel set 60 consists of one set of inline wheels, it can be made up of more sets of inline wheels, if desired.

Clamp wheel 63A is attached to framework 24 and opposes side support member 50 and wheel set 60, and this is readily depicted in FIGS. 1–3 and 5. In accordance with a preferred embodiment and the general teachings provided by this specification, clamp wheel 63A is mounted for movement in reciprocal directions between a first position toward side support 50 of framework 24 and wheel set 60 and a second position away from side support 50 of framework 24 and wheel set 60. Virtually any attachment arrangement capable of facilitating a reciprocally adjustable mounting of clamp wheel 63A to framework 24 can be used.

In accordance with a preferred embodiment as best seen in FIGS. 2 and 3, an attachment 80 facilitates not only the attachment of clamp wheel 63A to framework 24, but also the reciprocal mounting of clamp wheel 63A to framework 24. Attachment 80 can be considered part of, or otherwise an extension of, framework 24. Attachment 80 secures clamp wheel 63A to side support member 50 at a generally intermediate location between ends 50A,50B.

Figure 5:
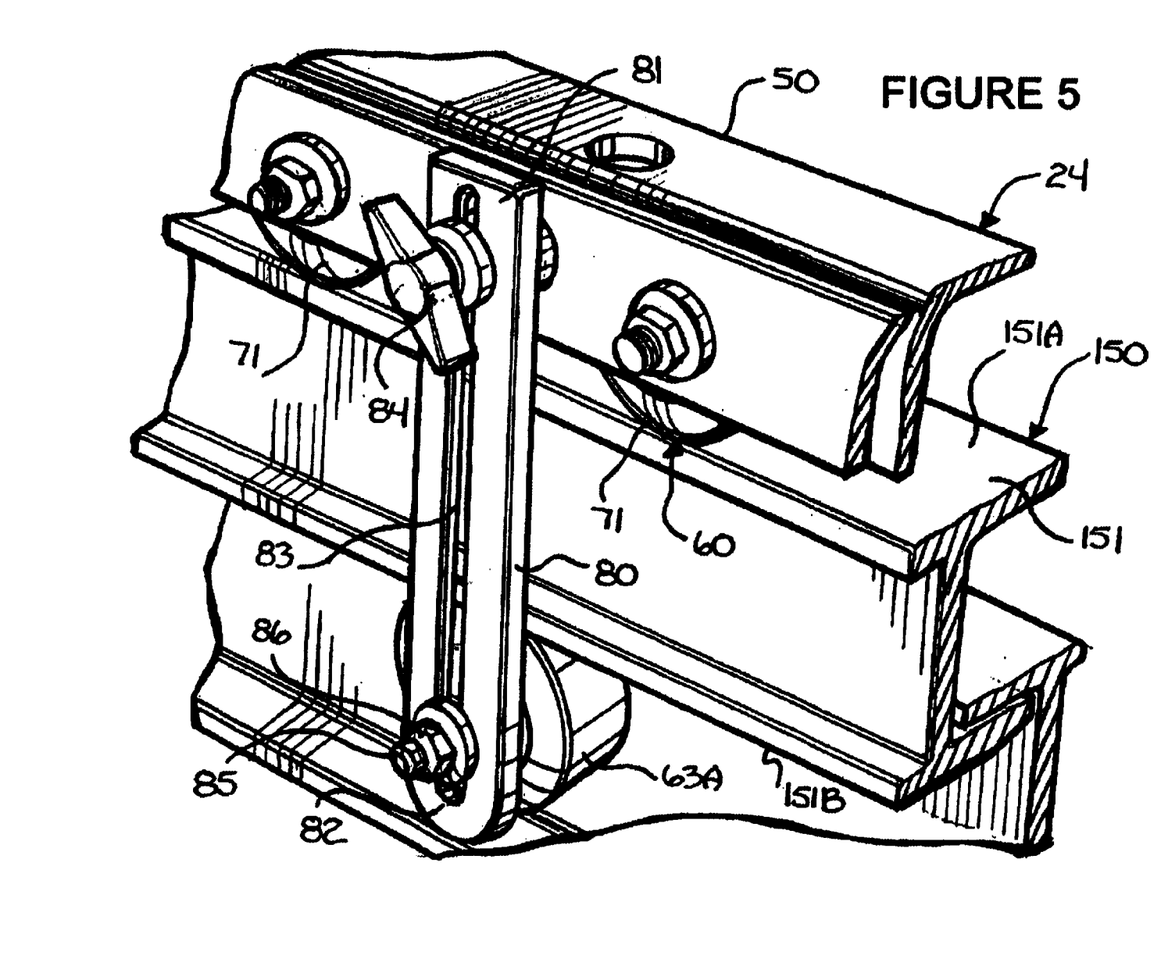
FIG. 5 is an enlarged fragmented view of the camera supporting apparatus of FIG. 1 illustrating an attached clamp wheel.

With regard to FIG. 5, attachment 80 is an elongate body having opposing proximal and distal ends 81,82 and an elongate slot 83 formed therethrough, which extends along substantially the entire length of attachment 80 from proximal end 81 to distal end 82. A handled threaded fastener 84 extends through slot 83 adjacent proximal end 81 of attachment 80 and threadably secures a threaded opening of framework 24 in a conventional manner of threaded attachment and is tightened securing attachment 80 to framework 24. A nut and bolt assembly secures clamp wheel 63A to attachment 80 proximate distal end 82. In the embodiment depicted in FIG. 1, clamp wheel 63A is attached to a bolt 85 that extends through slot 83 and is secured with a nut 86, which is tightened against attachment 80 securing clamp wheel 63A in place. Clamp wheel 63A rotates freely and, as a matter of preference, is of a type substantially identical each of those used in conjunction with wheel sets 60,61. By loosening nut 86 from a tightened state releasing clamp wheel 63A from its fixed engagement to attachment 80, wheel 63A can be moved and reciprocated along slot 83 relative to framework 24 and wheel set 60 and then tightened for securing clamp wheel 63A at a desired location along the length of attachment 80 between its proximal and distal ends 81,82. In the alternative, by loosening threaded fastener 84 from its tightened state releasing attachment 80 from its fixed engagement to framework 24, attachment 80 can be moved and reciprocated along slot 83 for moving clamp wheel 63A in reciprocal directions relative to framework 24 and wheel set 60 and then tightened for securing attachment 80 to framework 24 and clamp wheel 63A at a desired location.

Those having regard for the art will readily appreciate that virtually any mechanism for facilitating the releasable engagement of attachment 80 to framework 24 can be used and for permitting a reciprocal adjustment of attachment 80, which is also the case for clamp wheel 63A and its corresponding engagement to attachment 80. If desired, attachment 80 can be fixed in place to framework 24 and clamp wheel 63A reciprocally adjustable. In another embodiment, clamp wheel 63A can be fixed in place to attachment 80 and attachment 80 mounted to framework 24 for reciprocal movement as described.

As best seen in FIG. 4, clamp wheel 63B is attached to framework 24 and opposes side support member 51 (not referenced in FIG. 4) and wheel set 61. In accordance with a preferred embodiment and the general teachings provided by this specification, clamp wheel 63B is mounted for movement in reciprocal directions between a first position toward support member 51 of framework 24 and wheel set 61 and a second position away from support member 51 of framework 24 and wheel set 61. Virtually any attachment arrangement capable of facilitating a reciprocally-adjustable mounting of clamp wheel 63B to framework 24 can be used. Nevertheless, the attachment of clamp wheel 63B in conjunction with side support 51 of framework 24 is identical to the attachment of clamp wheel 63A in conjunction with side support 50 of framework 24, in which a corresponding attachment 80 and handled threaded fastener 84 are used. Because the teachings set forth in connection with the attachment of clamp wheel 63A apply also to clamp wheel 63B, further details concerning the attachment of clamp wheel 63B will not be set forth, as to do so would be unnecessarily repetitive. Although apparatus 20 incorporates two clamp wheels, namely, clamp wheels 63A,63B, more can be used, if desired.

Referring to FIG. 2, brace wheels 62A and 62B are spaced from one another along one side of framework 24 and attached to framework 24 and disposed laterally of and outboard of side support 50. Brace wheels 62C and 62D are spaced from one another along one side of framework 24 and attached to framework 24 and disposed laterally of and outboard of side support 51. In the immediate embodiment, bracket 90 secures brace wheel 62A to end 50A of side support 50, bracket 91 secures brace wheel 62B to end 50B of side support 50, bracket 92 secures brace wheel 62C to end 51A of side support 51, and bracket 93 secures brace wheel 62D to end 51B of side support 51. Brackets 90 and 91 can be attached to side support 50 at other locations along the length thereof for locating clamp wheels 62A and 62B at other locations, and brackets 92 and 93 can be attached to side support 51 at other locations along the length thereof for locating clamp wheels 62C and 62D at other locations. Consistent with this disclosure, brackets 90,91,92,93 can be attached to framework 24 at other locations, and even to end supports 52,53, if desired.

Figures 6, 7:
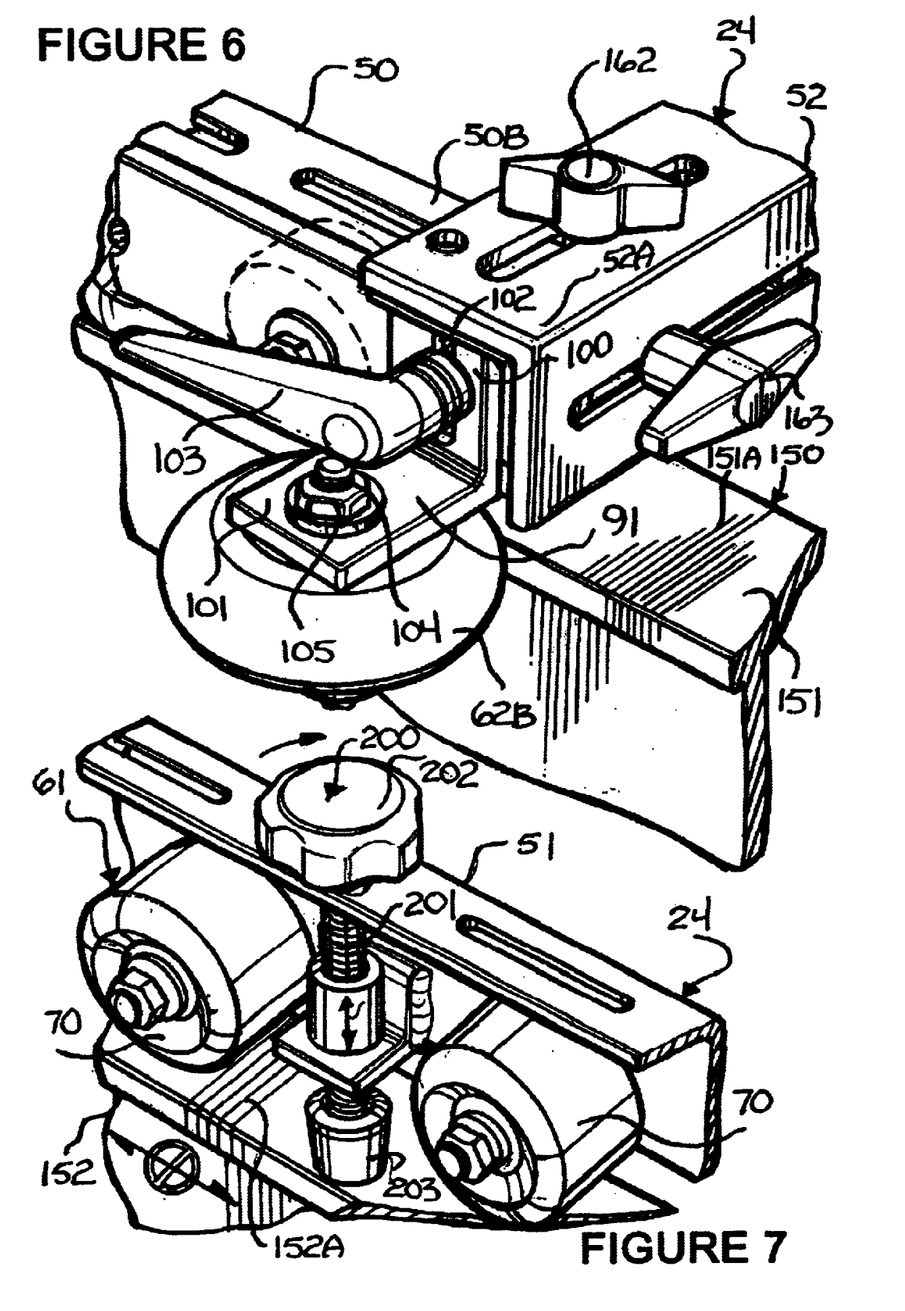
FIG. 6 is an enlarged fragmented view of the camera supporting apparatus of FIG. 1 illustrating an attached brace wheel.
FIG. 7 is an enlarged fragmented view of the camera supporting apparatus of FIG. 1 illustrating an attached brake.

Referring to FIG. 6, bracket 91 and brace wheel 62B are depicted and will now be addressed in detail. Bracket 91 facilitates the attachment of brace wheel 62B to framework 24. Bracket 91 is generally L-shaped having substantially perpendicular extremities 100,101 and can be considered part of, or otherwise an extension of, framework 24. An elongate slot 102 is formed through extremity 100, and handled threaded fastener 103 extends through slot 102 and threadably secures a threaded opening of framework 24 in a conventional manner of threaded attachment and is tightened securing bracket 91 to framework 24. A nut and bolt assembly secures brace wheel 62B to extremity 101. In the embodiment depicted in FIG. 6, brace wheel 62B is attached to a bolt 104 that extends through extremity 101 and is secured with a nut 105, which is tightened against extremity 101 securing brace wheel 62B in place. Brace wheel 62B rotates freely, is substantially perpendicular relative to wheel set 60 (not referenced in FIG. 6) and, as a matter of preference, is of a type substantially identical each of those used in conjunction with wheel sets 60,61. If desired, brace wheel 62B can be mounted to extremity 101 for movement in lateral reciprocal directions relative to wheel set 60 and framework 24, much like the way in which clamp wheels 63A,63B are reciprocally attached or, perhaps, in some other way. Like clamp wheels 63A,63B, brace wheel 62B can also be mounted for movement in vertical reciprocal directions, i.e., the same plane of reciprocal adjustment as clamp wheels 63A,63B, permitting brace wheel 62 to be located at a selected height. The attachment of brace wheels 62A,62C, 62D with their respective brackets is identical to that of brace wheel 62B, and will not be discussed because as to do so would be unnecessarily repetitive.

By loosening nut 86 from a tightened state releasing clamp wheel 63A from a fixed engagement to attachment 80, wheel 63A can be reciprocated along slot 83 relative to framework 24 and wheel set 60 and then tightened for securing clamp wheel 63A at a desired location along the length of attachment 80 between its proximal and distal ends 81,82. In the alternative, by loosening threaded fastener 84 from its tightened state releasing attachment 80 from its fixed engagement to framework 24, attachment 80 can be reciprocated along slot 83 for moving clamp wheel 63A in reciprocal directions relative to framework 24 and wheel set 60 and then tightened for securing attachment 80 to framework 24 and clamp wheel 63A at a desired location. Those having regard for the art will readily appreciate that virtually any mechanism for facilitating the releasable engagement of attachment 80 to framework 24 permitting a reciprocal adjustment of attachment 80 can be used, which is also the case for clamp wheel 63A and its corresponding engagement to attachment 80. If desired, attachment 80 can be fixed in place to framework 24 and clamp wheel 63A reciprocally adjustable. In another embodiment, clamp wheel 63A can be fixed in place to attachment 80 and attachment 80 mounted to framework 24 for reciprocal movement as described.

Apparatus 20 is to be attached to a support structure for wheeled movement permitting panning video camera shots. In FIG. 1, the support structure depicted is a ladder 150 having elongate and opposing substantially parallel sidepieces 151,152 joined at intervals by rungs 153. Any ladder can be used, with ladder 150 being generally representative of a typical ladder. Sidepieces 151,152 have upper surfaces 151A,152A and opposing lower surfaces 151B,152B, respectively. In accordance with the invention, wheel sets 60,61 are presented against upper surfaces 151A,152A, respectively, in which upper surfaces 151A,152A function essentially as tracks upon which wheel sets 60,61 ride. The inline character of wheel sets 60,61 is desirable providing an exemplary and highly stable wheeled attachment of framework 24 to sidepieces 151,152. It will be appreciated in FIGS. 1 and 4 that the width of framework 24 is provided specifically to ensure that the wheels of wheel sets 60,61 reside squarely against upper surfaces 151A,152A, respectively, in which the substantially parallel disposition of wheel sets 60,61 corresponds with the substantially parallel state of sidepieces 151,152.

As best seen in FIG. 4, clamp wheels 63A,63B are disposed underneath lower surfaces 151B,152B, respectively, and adjusted accordingly to present against or otherwise adjacent lower surfaces 151B,152B, respectively, in which sidepiece 151 is secured or otherwise clamped by and between wheel set 60 and clamp wheel 63A (see also FIG. 5) and sidepiece 152 is secured or otherwise clamped by and between wheel set 61 and clamp wheel 63B. This rollered clamping of sidepieces 150,151 by wheel sets 60,61 and clamp wheels 63A,63B permits the rollered movement of apparatus 20 along ladder 150 and provides a secure rollered clamping attachment of apparatus 20 to ladder 150, which prevents apparatus 20 from falling away from ladder 150, in accordance with the principle of the invention.

Looking FIG. 2, brace wheels 62A,62B are disposed adjacent and outboard of sidepiece 151, and brace wheels 62C,62D are disposed adjacent and outboard of sidepiece 152. Preferably, brace wheels 62A,62B engage against and are thus rollered to the outer side of sidepiece 151, and brace wheels 62C,62D engage against and are thus rollered to the outer side of sidepiece 152. Brace wheels 62A,62B,62C,62D facilitate a rollered bracing of apparatus 20 to ladder 150, substantially preventing side-to-side movement of apparatus 20. As previously intimated, brace wheels 62A,62B,62C, 62D can be made adjustable to permit them to be suitably positioned relative to sidepieces 151,152 as herein disclosed. With a camera attached to high hat 22, such as camera 40 denoted in FIGS. 1 and 4, panning camera shots can be made by moving apparatus 20 across ladder 150. The rollered bracing of apparatus 20 facilitated by brace wheels 62A, 62B,62C,62D and the rollered clamping of apparatus 20 facilitated by wheel sets 60,61 and clamp wheels 63A,63B ensure a secure rollered attachment of apparatus 20 to ladder 150 and prevent apparatus 20 from inadvertently detaching from ladder 150, which could cause apparatus 20 at its attached camera to fall to the ground and break or become damaged. One or each of brace wheels 62A,62B can be disposed inboard of sidepiece 151 if desired and thus rollered to the inner side of sidepiece 151. One or each of brace wheels 62C,62D can be disposed inboard of sidepiece 152 if desired and thus rollered to the inner side of sidepiece 152. Although apparatus 20 incorporates four brace wheels, namely, brace wheels 62A,62B,62C,62D, less or more can be used.

The attachment and detachment of apparatus 20 to ladder 150 can be made by selectively attaching and detaching clamp wheels 63A,63B to and from framework 24 and appropriately attaching and adjusting clamp wheels 63A, 63B to carry out the rollered clamping of apparatus 20 as herein disclosed. In other words, apparatus 20 is secured to ladder 150 by selectively disassembling apparatus 20 and assembling apparatus 20. In some instances it may not be necessary to selectively disassemble and assemble apparatus 20 to effect its attachment. Although it hardly seems worth mentioning, apparatus 20 can be configured to permit it to be installed without having to disassemble it first, or at least partially disassemble it by detaching or loosening clamp wheels 63A,63B and/or brace wheels 62A,62B,62C,62D.

Sidepieces 151,152 of ladder 150 constitute opposing supports. Apparatus 20 can be used in connection with other opposing supports, such as the opposing marginal edges of a table, bench, and the like, opposing rails, etc. When apparatus 20 is attached to a ladder, such as ladder 150, or other support structure in accordance with the principle of the invention, such a ladder or support structure is considered part of the invention.

Figure 9:
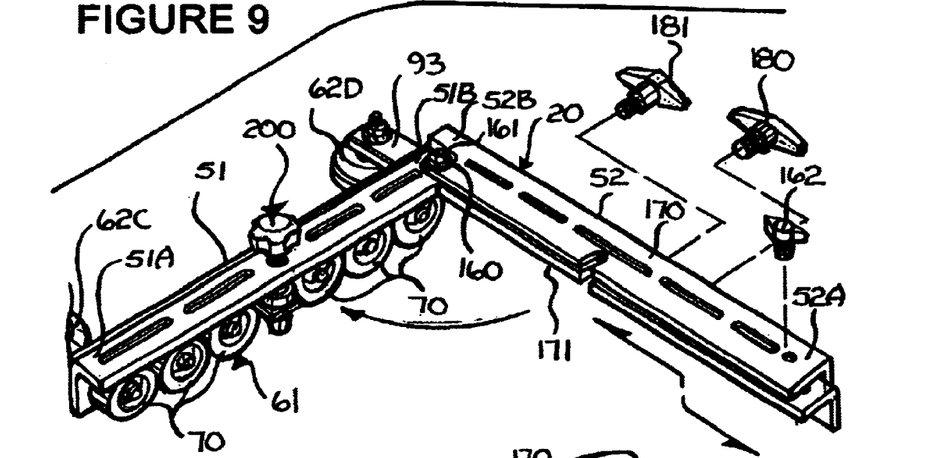
FIG. 9 is a partially exploded perspective view of portions of the camera supporting apparatus of FIG. 1 illustrating attached support members and an attached wheel set.

Considering for a moment framework 24, it is to be understood that virtually any manner of attachment can be used to secure ends 50A,50B of side support 50 to ends 53A,52A of end supports 53,52, respectively, and to secure ends 51A,51B of side support 51 to ends 53B,52B of end supports 53,52, respectively. The attachment of the ends can be rigid or otherwise detachable, which is preferred for permitting framework 24 to be easily assembled and disassembled. Fixed and/or detachable pivoting attachments between the ends of the supports can also be used. In accordance with this disclosure, suitable attachment mechanisms can include welding, nut and bolt assemblies, threaded fasteners, rivets, a selected fixed joint structure, a selected detachable joint structure, a selected pivoting joint structure, etc. As a matter of example, FIG. 9 illustrates a nut 160 and bolt 161 assembly securing end 51B of side support 51 to end 52B of end support 52. In FIG. 6, handled threaded elements 162,163 are illustrated, threadably securing end 52A of end support 52 to end 50B of side support 50, in which threaded elements 162,163 are tightened securing ends 52A,50B together. Corresponding nuts can be used with threaded elements 162,163, if desired, and with any of the threaded elements discussed in this specification. This arrangement can be used with any of the other attachment joints of framework 24. In FIG. 10, one handled threaded element 164 is employed threadably securing and end 52A of end support 52 to end 50B of side support 50, in which threaded element 164 is tightened securing ends 52A,50B together. A corresponding bolt can be used with threaded element 164, if desired. This arrangement can be used with any of the other attachment joints of framework 24.

Framework 24 can be constructed of any desired length as defined by the length of side supports 50,51 and any desired width as defined by the length of end supports 52,53. Supports 50,51,52,53 can each constitute a single piece, or a plurality of attached pieces, whether two or more. It is to be understood that the designations of ends 50A,50B,51A, 51B,52A,52B,53A,53B, which are general designations, do not change in accordance with the teachings of this disclosure, regardless of the number of elongate elements which are used to form the side and end supports.

As a matter of illustration, and with reference to FIG. 9, end support 52 is made up of a pair of substantially coextensive elongate members 170,171, which mate and are capable of reciprocating together between shortened and lengthened states, and which are capable of being secured together with, for instance, handled threaded fasteners 180, 181. Corresponding nuts can be used with threaded fasteners 180,181, if desired. Virtually any attachment structure can be used for permitting the reciprocal adjustment of elongate members 170,171 and for permitting elongate members 170,171 to be secured to one another at a desired length, This is preferred and end support 53 is preferably similarly constructed, permitting the adjustment of the width of framework 24 between widened shortened states and the corresponding reciprocal adjustment of wheel sets 60,61 between a narrowed position toward one another and a widened position away from one another. This reciprocating adjustability of end supports 52,53 is desirable, as it permits wheel sets 60,61 to be adjusted accordingly for fitting the supports of support structures having varying widths, such as ladders of varying widths, tables or benches having marginal side extremities or edges disposed at varying widths, etc. Those having regard for the art will appreciate that, in accordance with the nature and scope of the invention described herein, that wheel sets 60,61 can be mounted to framework 24 for reciprocal movement relative to one another in other ways, whether independently of framework 24, such as with attached tracks or the like, or by adjusting framework 24. Wheel sets 60,61 can also be separate assemblies engagable to framework 24 at desired locations between narrowed and widened states, which is considered a manner of reciprocal attachment of wheel sets 60,61 within the scope of the invention.

In the course of using apparatus 20, it may be desirable to secure it in place during use. To allow it 20 to be secured in place, apparatus incorporates a brake 200 (FIGS. 4 and 7). Looking to FIG. 7, brake 200 consists of a knobbed/handled element 201 mounted to framework 24 for movement in reciprocal directions as indicated by the double arrowed line A between retracted and extended conditions. Element 201 is elongate and has opposing handled 202 and abutment ends 203. In the immediate embodiment, element 201 is supported by side support 51, and is threaded and is threadably secured to a threaded sleeve 204 carried by a bracket 205 fixed to side support 51 between adjacent wheels 70 of wheel set 61. Bracket 205 is secured with welding, but virtually any suitable attachment structure can be used without departing from the invention. When disposed with ladder 150, brake 200 opposes upper surface 152A of sidepiece 152 and is movable in response to rotation thereof (handled end 212 can be taken up by hand and rotated) between its retracted condition away from upper surface 152A and a second position toward upper surface 152A engaging abutment end 203 against upper surface 152A thus securing apparatus 20 in place preventing its rollered movement. Brake 200 can be attached to apparatus 20 at other locations for permitting it to interact to a support structure to which apparatus 20 is attached for securing apparatus 20 in place in accordance with the teachings of this specification. Rather than securing a surface of a support to which apparatus 20 is attached, brake 20 can be adapted and arranged to interact with and lock one of the wheels of either of wheel sets 60,61 for securing apparatus 20 in place. Although one brake is disclosed, more can be employed if desired.

Figure 8:
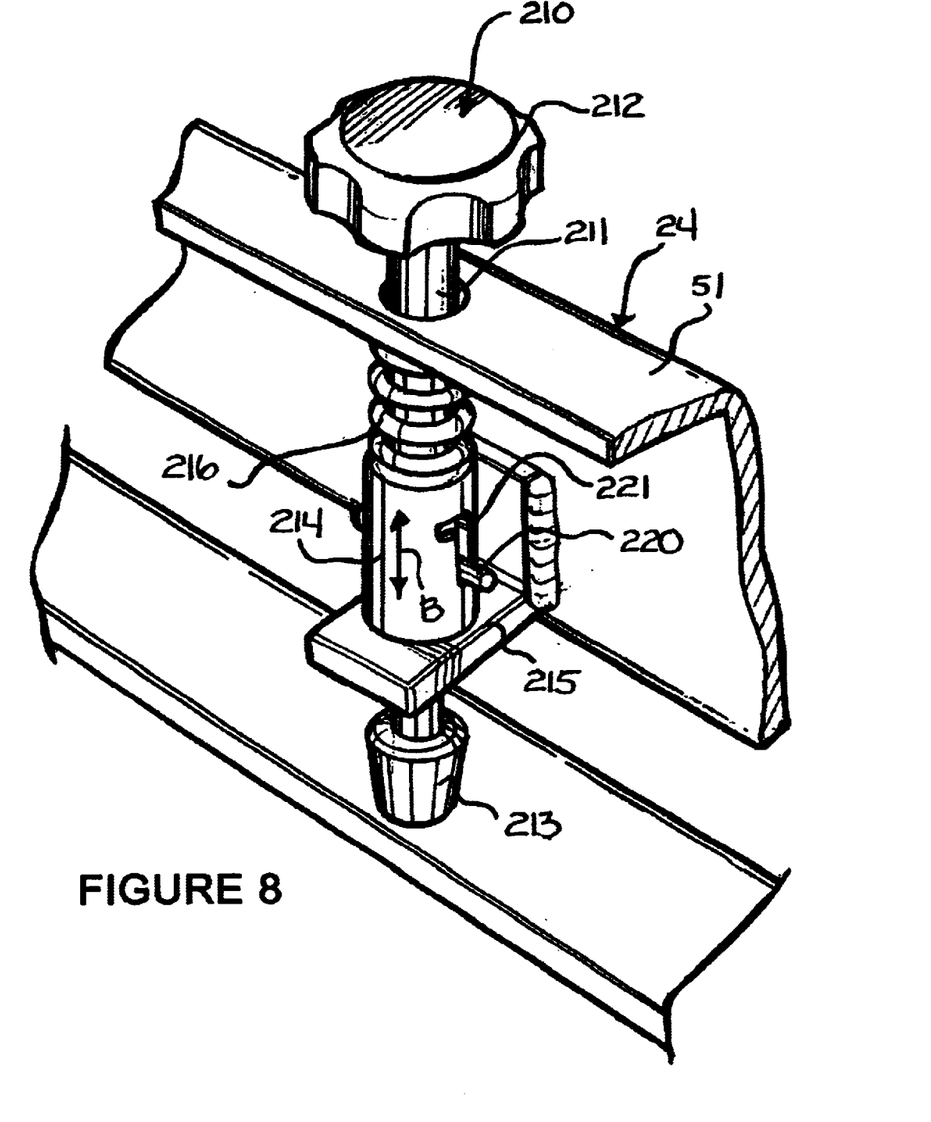
FIG. 8 is an alternate embodiment of a brake for use with the camera supporting apparatus of FIG. 1.

Other brake forms capable of securing apparatus 20 in place can be used. As an example, another embodiment of a brake 210 is depicted in FIG. 8. Brake 210 consists of a knobbed/handled element 211 mounted to framework 24 for movement in reciprocal directions as indicated by the double arrowed line B between retracted and extended conditions. Element 211 is elongate and has opposing handled 212 and abutment ends 213. In the immediate embodiment, element 201 is supported by side support 51, and is secured by and extends through a sleeve 214 carried by a bracket 215 fixed to side support 51. Bracket 215 is secured with welding, but virtually any suitable attachment structure can be used without departing from the invention. An attached biasing element 216 is also provided, which, in this specific embodiment, is a compression spring that encircles element 211 and is disposed between and interacts with sleeve 214 and support member 51. A pin 220 carried by element 211 extends through an angled slot 221 formed through sleeve 214. The bias applied by biasing element 216 urges element 211, and thus abutment end 213, into an extended condition away from framework 24 for securing a surface of a support to secure in place a camera supporting apparatus constructed and arranged in accordance with the principle of the invention. Handled end 212 can be taken up by hand and pulled to overcome the biasing force of biasing element 216 to move element 211 into its retracted condition. By rotating element 211, pin can be oriented in slot 221 locking element 211 in its retracted condition and permitting it to assume its extended condition. Brake 210 can be adapted and arranged to lock one of the wheels of the wheel sets of a camera supporting apparatus constructed and arranged in accordance with the principles of the invention.

In sum, the invention provides apparatus 20 consisting of camera supporting chassis 21 having attached clamp wheel assemblies 60,61, which secure opposing supports 150,151 of a support structure. Clamp wheel assemblies 60,61 not only secure chassis 21 to supports 150,151, but also permit rollered movement of chassis 21 along supports 150,151, allowing panning camera shots with camera 40 attached to chassis 21. When apparatus 20 is attached to supports 150,151, supports 150,151 are considered part of the invention in combination.

And so the present invention is described above with reference to preferred embodiments. However, those skilled in the art will recognize that changes and modifications may be made in the described embodiments without departing from the nature and scope of the present invention and that the positioning of engagement pairs can be reversed. Also, a biased, retractable mechanism, such as one or more piston assemblies or spring biased assemblies or the like, can be incorporated with apparatus 20 for permitting the easy and efficient adjustment apparatus 20 between its narrowed condition consisting of wheel sets 60,61 disposed toward one another, and its widened condition consisting of wheel sets 60,61 disposed away from one another. End supports 52,53 can be reciprocally attached elements permitting apparatus 20 to automatically adjust its width when clamped to support structures that are not entirely parallel to one another. In this regard, piston assemblies or other forms of reciprocal structures can be used for end supports 52,53, if desired, which is also the case for side supports 50,51. Further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:
   a camera supporting chassis having attached wheel sets; and
   a clamp wheel attached to the chassis opposing one of the wheel sets;
   wherein the wheel sets are adjustable between a first position toward one another and a second position away from one another.

2. Apparatus of claim 1, further comprising another clamp wheel attached to the chassis opposing the other of the wheel sets.

3. Apparatus of claim 1, wherein one of the wheel sets comprises attached inline wheels.

4. Apparatus of claim 3, wherein the other of the wheel sets comprises attached inline wheels.

5. Apparatus of claim 1, wherein the clamp wheel is mounted for movement in reciprocal directions in opposition to the one of the wheel sets.

6. Apparatus of claim 2, wherein the other clamp wheel is mounted for movement in reciprocal directions in opposition to the other of the wheel sets.

7. Apparatus of claim 1, further comprising a brace wheel secured to the chassis and disposed laterally of one of the wheel sets.

8. Apparatus of claim 7, further comprising another brace wheel secured to the chassis and disposed laterally of the other of the wheel sets.

9. Apparatus of claim 1, further comprising a brake attached to the chassis capable of securing the chassis in place.

10. Apparatus of claim 1, further comprising a camera attached to the chassis.

11. Apparatus of claim 1, further comprising a support member secured by and between one of the wheel sets and the clamp wheel.

12. Apparatus of claim 2, further comprising another support member secured by and between the other of the wheel sets and the other clamp wheel.

13. Apparatus of claim 2, further comprising:
   a ladder comprising opposing sidepieces joined at interval by rungs;
   one of the sidepieces secured by and between one of the wheel sets and the clamp wheel; and
   the other of the sidepieces secured by and between the other of the wheel sets and the other clamp wheel.

14. Apparatus comprising:
   a camera supporting chassis having attached opposing first and second wheel sets;

a first clamp wheel attached to the chassis opposing the first wheel set; and a second clamp wheel attached to the chassis opposing the second wheel set;

wherein the wheel sets are adjustable between a first position toward one another and a second position away from one another.

15. Apparatus of claim 14, wherein the first wheel set comprises attached inline wheels.

16. Apparatus of claim 14, wherein the second wheel set comprises attached inline wheels.

17. Apparatus of claim 14, wherein the first clamp wheel is mounted for movement in reciprocal directions in opposition to the first wheel set.

18. Apparatus of claim 14, wherein the second clamp wheel is mounted for movement in reciprocal directions in opposition to the second wheel set.

19. Apparatus of claim 14, further comprising a brace wheel secured to the chassis and disposed laterally of the first wheel set.

20. Apparatus of claim 14, further comprising a brace wheel secured to the chassis and disposed laterally of the second wheel set.

21. Apparatus of claim 14, further comprising a brake attached to the chassis for securing the chassis in place.

22. Apparatus of claim 14, further comprising a camera attached to the chassis.

23. Apparatus of claim 13, further comprising:

a first support member secured by and between the first wheel set and the first clamp wheel; and a second support member secured by and between the second wheel set and the second clamp wheel.

24. Apparatus of claim 14, further comprising:

a ladder comprising opposing sidepieces joined at intervals by rungs;

one of the sidepieces secured by and between the first wheel set and the first clamp wheel; and the other of the sidepieces secured by and between the second wheel set and the second clamp wheel.

25. Apparatus comprising:

a camera supporting chassis having attached substantially parallel first and second inline wheel sets;

a first clamp wheel attached to the chassis opposing the first inline wheel set; and a second clamp wheel attached to the chassis opposing the second inline wheel set;

wherein the first and second inline wheel sets are adjustable between a first position toward one another and a second position away from one another.

26. Apparatus of claim 25, wherein the first clamp wheel is mounted for movement in reciprocal directions in opposition to the first inline wheel set.

27. Apparatus of claim 25, wherein the second clamp wheel is mounted for movement in reciprocal directions in opposition to the second inline wheel set.

28. Apparatus of claim 25, further comprising a brace wheel secured to the chassis and disposed laterally of the first inline wheel set.

29. Apparatus of claim 25, further comprising a brace wheel secured to the chassis and disposed laterally of the second inline wheel set.

30. Apparatus of claim 25, further comprising a brake attached to the chassis for securing the chassis in place.

31. Apparatus of claim 25, further comprising a camera attached to the chassis.

32. Apparatus of claim 25, further comprising:

a first support member secured by and between the first inline wheel set and the first clamp wheel; and a second support member secured by and between the second inline wheel set and the second clamp wheel.

33. Apparatus of claim 25, further comprising:

a ladder comprising opposing sidepieces joined at intervals by rungs;

one of the sidepieces secured by and between the first inline wheel set and the first clamp wheel; and the other of the sidepieces secured by and between the second inline wheel set and the second clamp wheel.

34. Apparatus comprising:

opposing substantially parallel supports;

a camera carried by a chassis having attached substantially parallel first and second inline wheel sets;

a first clamp wheel attached to the chassis opposing the first inline wheel set;

a second clamp wheel attached to the chassis opposing the second inline wheel set;

one of the supports secured by and between the first inline wheel set and the first clamp wheel; and the other of the supports secured by and between the second inline wheel set and the second clamp wheel;

wherein the first and second inline wheel sets are adjustable between a first position toward one another and a second position away from one another.

35. Apparatus of claim 34, wherein the first clamp wheel is mounted for movement in reciprocal directions in opposition to the first inline wheel set.

36. Apparatus of claim 34, wherein the second clamp wheel is mounted for movement in reciprocal directions in opposition to the second inline wheel set.

37. Apparatus of claim 34, further comprising a first brace wheel secured to the chassis and disposed laterally of and opposing the one of the supports.

38. Apparatus of claim 37, further comprising a second brace wheel secured to the chassis and disposed laterally of and opposing the other of the supports.

39. Apparatus of claim 34, further comprising a brake attached to the chassis for movement between a first position away from one of the supports and a second position securing the chassis to one of the supports.

* * * * *